April 20, 1937.　　M. HAGEDORN ET AL　　2,077,789
ANTIHALATION LAYER
Filed March 28, 1935
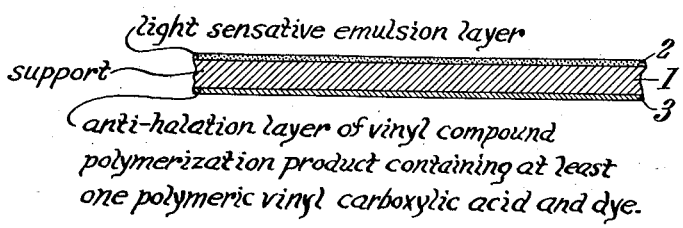
light sensative emulsion layer
support
anti-halation layer of vinyl compound polymerization product containing at least one polymeric vinyl carboxylic acid and dye.
INVENTORS
Max Hagedorn
Adolf Jung
Gustav Wilmanns
By　Attorney Patented Apr. 20, 1937

2,077,789

UNITED STATES PATENT OFFICE

2,077,789
ANTIHALATION LAYER

Max Hagedorn and Adolf Jung, Dessau, and Gustav Wilmanns, Wolfen Kreis Bitterfeld, Germany, assignors to Agfa Ansco Corporation, Binghamton, N. Y., a corporation of New York Application March 28, 1935, Serial No. 13,447
In Germany March 31, 1934

5 Claims. (Cl. 95—8)

Our present invention relates to anti-halation layers for photographic plates and films.

One of its objects is to provide a photographic plate or film with an anti-halation layer soluble in the photographic baths. Further objects will be seen from the detailed specification following hereafter.

It has already been proposed to use anti-halation layers and filter layers for photographic plates or films in which the binding agent consists quite generally of an artificial resin having a salt-forming hydroxyl- or carboxyl group. Particularly mention is made of resin condensation products.

According to the present invention an improved binding agent is furnished by resins having a salt-forming hydroxyl- or carboxyl group and derived from polymerized aliphatic or aromatic unsaturated carboxylic acids or mixed polymerization products containing such carboxylic acids. Since such highly polymerized materials themselves form stable films without supports they are better suited than resins for the production of close layers resistant to mechanical damage. At the same time they are freely soluble in the alkaline baths.

Polymerization products of this kind are polyacrylic acid, polystyreneacrylic acid and mixed polymerization products of the following kind: polyvinylchloride-polyacrylic acid, polyacrylic acid nitrile-polystyrenecarboxylic acid, polystyrenemaleic acid or the like.

It is a matter of indifference whether these polymerization products are made by direct polymerization of the acids or anhydrides or indirectly, for instance, by complete or partial saponification of the products obtained by polymerizing esters.

These polymerization products can be applied in admixture with suitable dyestuffs and in an organic solvent for forming anti-halation layers and filter layers.

The following examples illustrate the invention:

*Example 1.*—The solution for application in producing an anti-halation layer on the back of a film or plate consists of

| | |
|---|---|
| Polystyreneacrylic acid_____grams__ | 10 |
| Aurinetricarboxylic acid (Schultz, Farbstofftabellen 1914, No. 557)_____grams__ | 2 |
| Propanol_____cc__ | 100 |
| Isobutanol_____cc__ | 500 |

*Example 2.*—Another solution suitable for the same purpose consists of

| | |
|---|---|
| The polymerization product consisting of 10 per cent of polyacrylic acid nitrile, 90 per cent of polyacrylic acid_____grams__ | 10 |
| Oxytolylaminofuchsone-dicarboxylic acid (obtainable by condensation of para-tolylamino-benzaldehyde and ortho-cresolinic acid and oxidation of the leuco-compound thus produced)_____grams__ | 2 |
| Propanol_____cc__ | 100 |
| Isobutanol_____cc__ | 500 |

*Example 3.*—Another solution for application in the same manner consists of

| | |
|---|---|
| Polystyrenemaleic acid_____grams__ | 10 |
| Dimethyloxyfuchsone-dicarboxylic acid (obtainable by condensation of benzaldehyde and ortho-cresolinic acid and oxidation of the leuco-compound thus produced) grams__ | 2 |
| Propanol_____cc__ | 100 |
| Isobutanol_____cc__ | 500 |

The layers produced from the solutions described in the foregoing examples are dissolved from the plate or film by alkaline developers without leaving a trace of coloring matter thereon or dirtying the developer.

The accompanying drawing illustrates the invention. The figure represents a sectional view of a photographic plate. *I* is the glass plate which serves as support, 2 is the emulsion layer, 3 is the anti-halation layer applied to the back of the plate.

What we claim is:

1. A photographic plate or film comprising a support bearing on one side a light sensitive emulsion layer and on the other side an anti-halation layer comprising a polymerization product selected from the group consisting of polyacrylic acid, polystyreneacrylic acid, polyvinylchloride-polyacrylic acid, polyacrylic acid nitrile-polystyrenecarboxylic acid, polystyrenemaleic acid, and a dye.

2. A photographic plate or film comprising a support bearing on one side a light sensitive emulsion layer and on the other side an antihalation layer comprising polystyreneacrylic acid and aurinetricarboxylic acid.

3. A photographic plate or film comprising a support bearing on one side a light sensitive emulsion layer and on the other side an anti-halation layer comprising a mixture of polyacrylic acid nitrile and polyacrylic acid, and oxytolylamino-fuchsone-dicarboxylic acid.

4. A photographic plate or film comprising a support bearing on one side a light sensitive emulsion layer and on the other side an anti-halation layer comprising polystyrenemaleic acid and dimethyloxyfuchsone-dicarboxylic acid.

5. A photographic plate or film comprising a support bearing on one side a light sensitive emulsion layer and on the other side an anti-halation layer comprising a vinyl compound polymerization product containing at least one polymeric vinyl carboxylic acid and a dye.

MAX HAGEDORN.
ADOLF JUNG.
GUSTAV WILMANNS.